Feb. 10, 1925.

J. KORMOS 1,526,224

LIFE AND MONEY SAVING DEVICE

Filed Aug. 18, 1922

J. Kormos
INVENTOR

BY Victor J. Evans
ATTORNEY

WITNESS:

Patented Feb. 10, 1925.

1,526,224

UNITED STATES PATENT OFFICE.

JOZSEF KORMOS, OF FRANKFORT, KENTUCKY.

LIFE AND MONEY SAVING DEVICE.

Application filed August 18, 1922. Serial No. 582,821.

*To all whom it may concern:*

Be it known that I, JOZSEF KORMOS, a citizen of the Republic of Hungary, residing at Frankfort, in the county of Franklin and State of Kentucky, have invented new and useful Improvements in Life and Money Saving Devices, of which the following is a specification.

This invention has for its primary object, the provision of a device designed for the safe keeping of money or other valuables, and adapted for use in banks, mail cars, and other places where use for the same can be found.

More specifically stated, the invention embodies a compartment wherein the walls of the compartment are provided with ventilating openings and larger openings arranged at suitable points to permit the guard or person occupying the compartment to have a clear view of the interior view of the bank, mail car or other place in which the compartment is arranged; said openings having closures for these openings as the occasion requires.

In the drawing forming part of this application, like numerals of reference indicate similar parts in the several views, and wherein:—

Figure 1:
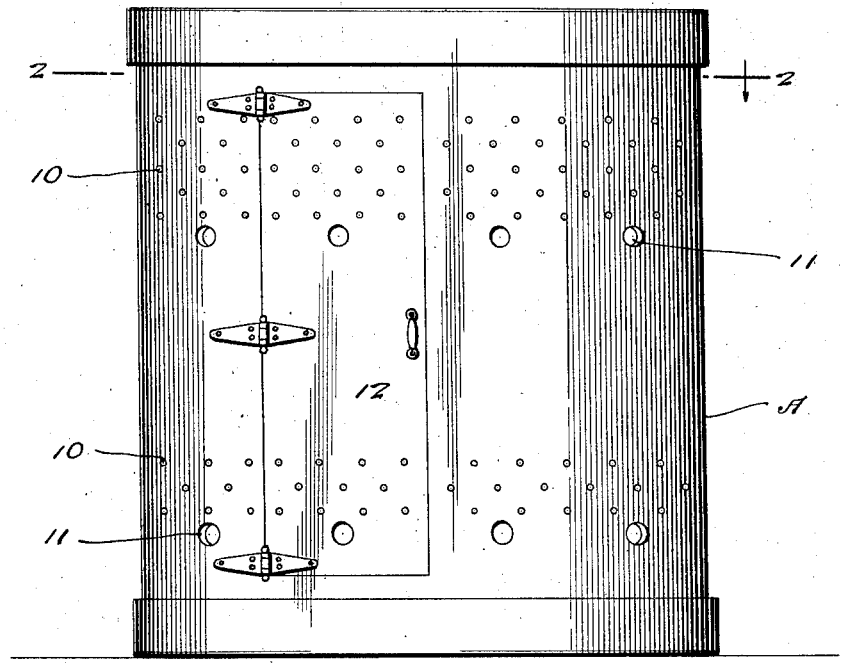
Figure 1 is an elevation of the device forming the subject matter of the invention.
Figure 2:
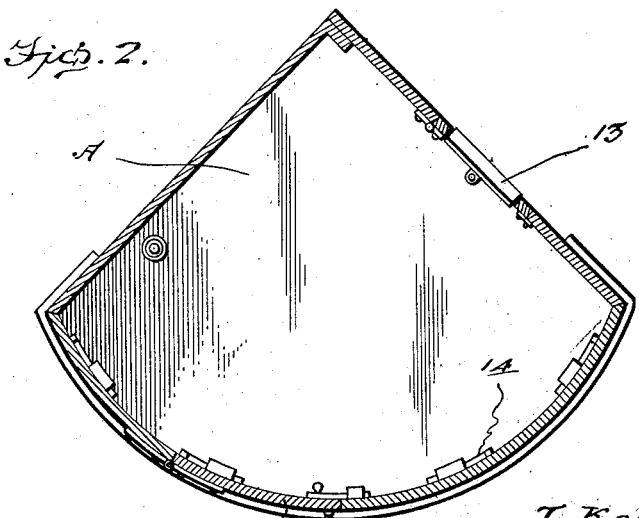
Figure 2 is a sectional view of the device taken on line 2—2 of Figure 1.

Referring to the drawing in detail, A indicates generally a compartment in which money and other valuables are adapted to be guarded for safe keeping, it being understood that the compartment is primarily intended to be used in banks, mail cars, and if made of proper size can also be used in motor operated vehicles. The walls of the compartment are made from bullet proof material, and are provided with ventilating openings 10, and larger openings 11, the latter being utilized as sight openings as well as permitting the occupant of the compartment to fire a gun through said openings. The compartment is provided with one or more doors 12, there being preferably two of these doors, and also provided with one or more windows 13. The compartment when used in a bank is arranged in the vicinity of the cashier's window, and if desired may be built in the wall. The walls of the compartments provided with the sight openings, are equipped with closures 14, which can be arranged to cover the sight openings as the occasion may require.

The occupant of the compartment may uncover any of these openings, to keep watch on suspicious persons who may enter the bank or other place where the compartment is used, and in case of necessity may use these openings for the purpose of firing a gun therethrough. Should the compartment be used in mail cars, the compartment may be equipped with a means (not shown) for controlling the air brakes, so that the brakes of the train may be applied by the guard.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A safety compartment of the character described, said compartment being substantially triangular in cross section and including opposed flat walls and a connecting curved wall, a window supported by one of the flat walls, said curved wall having a plurality of sight openings arranged in spaced transverse series and above and below the transverse center thereof, a door mounted on the curved wall, and slides mounted upon the inside of said curved wall, there being one slide for each of said openings whereby any one or more of the openings may be used at one time.

In testimony whereof I affix my signature.

JOZSEF KORMOS.